Patented May 7, 1929.

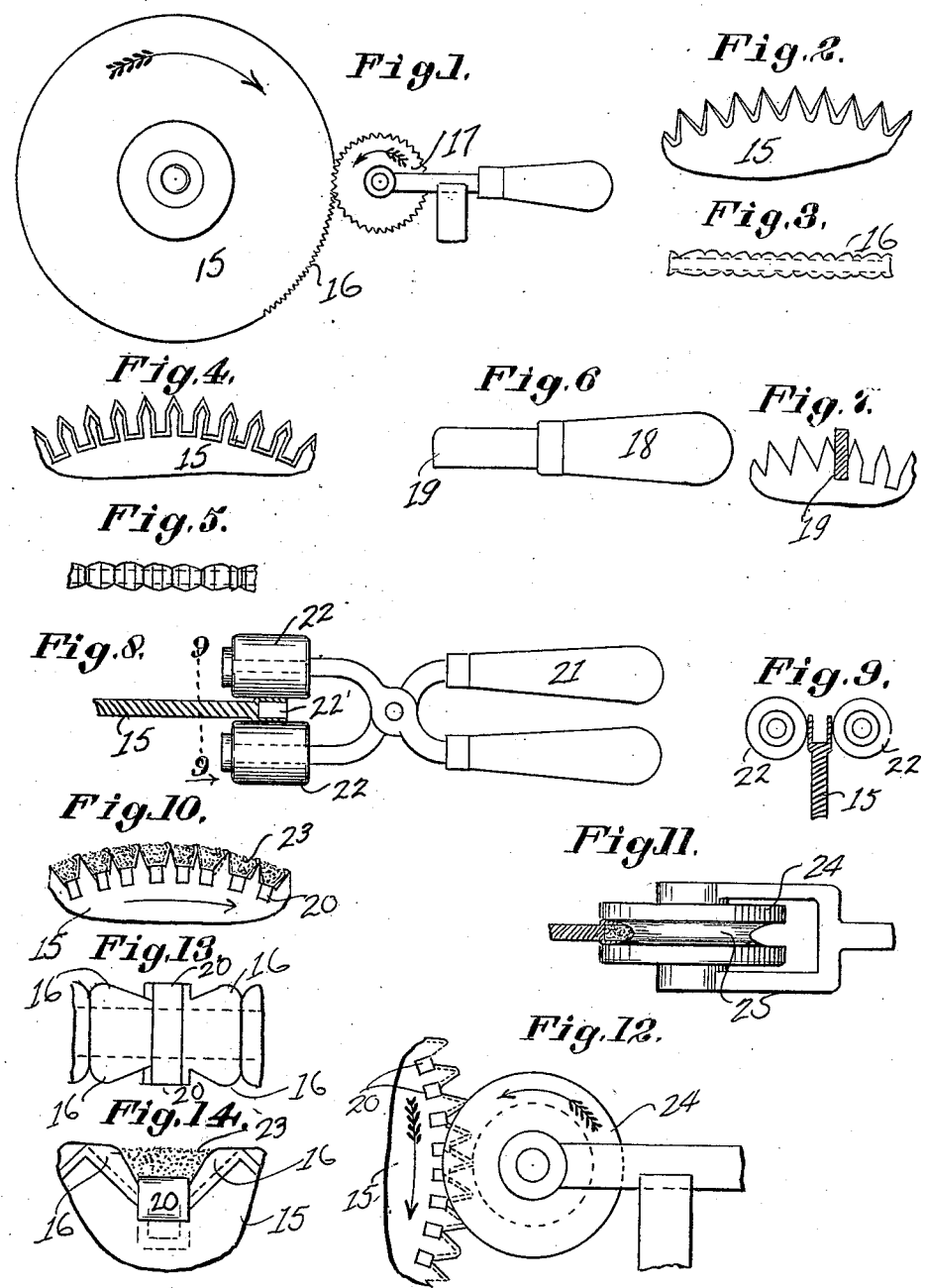

1,712,034

UNITED STATES PATENT OFFICE.

GEORGE J. FROMM, OF SAN BRUNO, CALIFORNIA.

DIAMOND-EDGED SAW AND METHOD OF MAKING THE SAME.

Application filed August 22, 1927. Serial No. 214,686.

This invention relates to improvements in cutting tools and has particular reference to the imbedding in the periphery of a circular saw, of a cutting medium preferably diamonds, for effectively and quickly cutting hard substances such as agate or the like.

My invention not only relates to the construction of the cutting edge but also to the method of securing and sealing the crushed diamonds so as to produce a cutting edge on the periphery of the saw that is smooth and highly efficient in its cutting function.

Briefly stated, I propose to form on the periphery of a circular saw of aluminium or similar soft material, small pockets or cavities in which are placed crushed diamonds and to further resort to a unique method in the formation of the pockets that assures a spreading or enlargement of the periphery of the saw body so that a cut larger than the body of the saw will be obtained, and yet I will eliminate in my method, the danger of the agate or like substance being cut, from binding, generating heat, or otherwise acting on the body of the saw.

Other objects and advantages will be apparent during the course of the following description.

In the accompanying drawings forming a part of this specification, and in which like numerals are employed to designate like parts throughout the same, Figure 1 is a side elevation of a saw disc, disclosing a roller contacting the periphery thereof, Figure 2 is a fragmentary detail view of the serrated edge of the saw after the application to the saw body of the roller disclosed in Figure 1, Figure 3 is a plan view of Figure 2, Figure 4 is a fragmentary detail view of the deepened pockets formed in the periphery of the saw, Figure 5 is a plan view of the same, Figure 6 is a side elevation of the saw with a cutting tool disclosed in elevation, Figure 7 is a detail side elevation of the saw showing the cutting tool in cross section as it acts upon the teeth.

Figure 8 is a section of the saw showing a crimping tool in position,

Figure 9 is a vertical transverse section on the line 9—9 of Figure 8,

Figure 10 is a fragmentary detail view of the saw with the diamonds positioned in the pockets thereof, Figure 11 is a sectional view of the saw body disclosing a finishing tool applied to the periphery thereof, Figure 12 is a side elevation of the same, Figure 13 is an enlarged detail plan view of the periphery of the saw, prior to the formation of the diamond holding pockets, Figure 14 is an enlarged detail side elevation disclosing the pockets formed in the periphery of the saw.

I am aware that tools have been heretofore provided for cutting agate or similar hard substances but to my knowledge, these cutting tools required the employment of diamond holding inserts in the body of the saw that function to cut the hard substances. In the present invention, I propose to eliminate the use of inserts which are exceedingly costly and are often unsatisfactory due to the displacement of the inserts because of the rapid rotation of the saw. I propose to integrally form with the body of the saw, diamond or the like holding pockets thereby eliminating the employment of inserts and to give to the trade an efficient, smooth cutting saw that will quickly cut hard substances.

In the accompanying drawings wherein for the purpose of illustration is shown a preferred embodiment of my invention, the numeral 15 designates the body of the saw which is preferably made of aluminium or similar soft metal so that small V-shaped teeth as indicated at 16 may be readily cut by the contact of a serrated roller 17 with the periphery of the saw, producing a formation of the teeth as disclosed to advantage in Figures 2 and 3.

After this operation I next utilize a cutting tool 18 as disclosed to advantage in Figure 6, which cutting tool is provided with a steel blade 19 preferably narrow and oblong so that when contact is made with the teeth 16 two leaf-like projections as indicated by the numeral 20 will be formed oppositely disposed to each other and positioned at the base of the depression.

The next step resorted to is the rotation of the saw body and the employment of a pair of tongs 21 equipped with rollers 22, which rollers are applied upon the sides of the saw, then drawn outwardly causing the leaf-like projections to turn parallel to the saw body, which action causes the formation of the pockets 22′ upon the periphery of the saw body as disclosed in Figures 8 and 9.

After the pockets have been thus formed, diamonds as indicated by the numeral 23 crushed to extreme fineness are placed in a substance, such as petroleum jelly and thereafter the petroleum jelly retaining the diamonds is positioned in the various pockets provided on the periphery of the saw.

For the finishing operation I propose to employ a steel roller as indicated by the numeral 24, which roller is provided with a curved V-shaped depression 25, which roller is firmly held against the periphery of the rotating saw body, which action will cause the leaf-like projections and the teeth to close tightly upon the diamonds and thus seal the same on the periphery of the saw.

From the foregoing description considered in conjunction with the accompanying drawing it will be evident that I have devised a highly efficient diamond-edge cutting saw and have resorted to a unique method in forming the pockets in the saw body and thereafter sealing the diamonds in position so that danger of loss or displacement of the diamonds will be eliminated.

It is to be further noted that in the method resorted to wherein I accomplish a spreading or enlargement of the periphery of the saw body by the use of the deep cutting tool 18, I eliminate the danger of the agate that is cut, binding, generating heat or otherwise acting on the body of the saw.

It is to be understood that the form of my invention herewith shown and described is to be taken as a preferred example of the same, and that various changes relative to the shape, size, material and arrangement of parts may be resorted to without departing from the spirit of the invention or the scope of the subjoined claims.

Having thus described my invention, I claim:—

1. The method of setting diamonds in a saw body which consists in forming teeth on the periphery of the body, deepening the teeth to provide an enlargement of the saw body adjacent the base of the teeth, compressing the teeth to form pockets and finally sealing diamonds in the pockets thus formed.

2. The method of setting diamonds or the like in a saw body which consists in forming teeth on the periphery of the body, deepening the teeth and crimping the material displaced in the deepening action of the teeth to form pockets and sealing diamonds in the pockets thus formed.

In testimony whereof I affix my signature.

GEORGE J. FROMM